United States Patent
Yoon

(10) Patent No.: US 11,878,580 B2
(45) Date of Patent: Jan. 23, 2024

(54) ACTIVE AIR FLAP APPARATUS FOR VEHICLE

(71) Applicant: HYUNDAI MOBIS Co., Ltd., Seoul (KR)

(72) Inventor: Hyeon Seok Yoon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 108 days.

(21) Appl. No.: 17/542,226

(22) Filed: Dec. 3, 2021

(65) Prior Publication Data

US 2022/0176808 A1     Jun. 9, 2022

(30) Foreign Application Priority Data

Dec. 8, 2020 (KR) .......................... 10-2020-0170873

(51) Int. Cl.
*B60K 11/08* (2006.01)

(52) U.S. Cl.
CPC .................................. *B60K 11/085* (2013.01)

(58) Field of Classification Search
CPC ....... B60K 11/085; B60K 11/08; B60K 11/06; B60Y 2400/405; B60Y 2306/05; Y02T 10/88; F16H 19/04
See application file for complete search history.

(56) References Cited

U.S. PATENT DOCUMENTS

| | | | | |
|---|---|---|---|---|
| 1,480,095 | A * | 1/1924 | Moller | F01P 7/10 49/77.1 |
| 1,858,289 | A * | 5/1932 | Tracy | E06B 7/084 49/82.1 |
| 1,891,485 | A * | 12/1932 | Tracy | E06B 7/084 49/82.1 |
| 5,141,026 | A * | 8/1992 | Collette | F01P 7/10 251/229 |
| 8,561,739 | B2 * | 10/2013 | Hori | B60K 11/085 180/68.1 |
| 8,915,320 | B2 * | 12/2014 | Chinta | B60K 11/085 180/68.1 |
| 9,168,827 | B2 * | 10/2015 | Povinelli | B60K 11/085 |

FOREIGN PATENT DOCUMENTS

KR    10-2020-0047038 A    5/2020

* cited by examiner

*Primary Examiner* — Kurt Philip Liethen
(74) *Attorney, Agent, or Firm* — Morgan, Lewis & Bockius LLP

(57) ABSTRACT

The present disclosure relates to an active air flap apparatus, and the active air flap apparatus includes a frame coupled to a rear surface of a grill in which an air inlet is formed, a flap portion slidably coupled to an inside of the frame to open or close the air inlet formed in the grill, an actuator coupled to an outside of the frame to transmit power to the flap portion to open or close the air inlet, and a gear unit configured to transmit the power generated from the actuator to the flap portion, in which the flap portion is provided as a pair of flap portions, and when the air inlet is closed, the pair of flap portions close an upper region and a lower region of the air inlet while a distance between end portions in a direction toward the air inlet increases.

17 Claims, 9 Drawing Sheets

ACTIVE AIR FLAP APPARATUS FOR VEHICLE

CROSS-REFERENCE TO RELATED APPLICATION

This application claims priority to and the benefit of Korean Patent Application No. 10-2020-0170873, filed on Dec. 8, 2020, the disclosure of which is incorporated herein by reference in its entirety.

BACKGROUND

1. Field of the Invention

The present invention relates to an active air flap apparatus, and more particularly, to an active air flap apparatus for a vehicle that is coupled to an air inlet of a grill to cool the inside of an engine room when a vehicle travels.

2. Discussion of Related Art

In heat exchangers, a heat exchange medium generally flows therein. The heat exchange medium inside the heat exchanger and air outside the heat exchanger exchange heat with each other, and thus, cooling or heat radiating is performed.

In order to stably operate various heat exchangers in an engine room of a vehicle, external air is required to be smoothly supplied into the engine room.

However, when a vehicle travels at a high speed, a large amount of outside air is introduced at high speed, and thus, air resistance becomes very large. Therefore, there is a problem in that fuel efficiency of the vehicle is reduced.

To solve this problem, an active air flap (AAF) has been developed, which improves fuel efficiency by increasing an opening angle during low-speed traveling to increase an amount of air introduced into the engine room and reducing the opening angle during high-speed traveling to reduce the amount of air inflow.

An active air flap includes a flap portion, and the flap portion is mounted on a rear surface of a grill and rotates to open or close an air inlet formed in the grill according to an operation of an actuator.

The air inlet is opened or closed according to the rotation of the flap portion, and thus, external air is introduced through the air inlet or blocked.

Specifically, when the vehicle travels at high speed, the flap portion closes the air inlet to reduce air resistance to improve fuel efficiency, and when the vehicle travels at low speed, the flap portion opens the air inlet to allow air to flow into the engine room so as to cool the overheated engine room.

A structure of the active air flap has one of various forms.

Among the structures of the active air flap having one of various forms, in a case of a structure in which a rotating shaft is fixed to a central portion of a flap portion in a width direction, the flap portion is opened or closed by rotating 90° by the rotating shaft.

In this case, in order to easily rotate the flap portion, the flap portion should protrude to the outside of a bumper.

In addition, in a case of a cantilever structure in which a rotating shaft is formed on one side of a flap portion, it is possible to prevent the flap portion from protruding to the outside of the bumper. However, when the air inlet is opened, a space as much as the height of the flap portion is required at the rear of the flap portion, and when the inlet is closed, a torque of an actuator rotating the flap inevitably increases as a traveling pressure applied to the flap portion increases.

In addition, when a dome (arc) type flap portion is applied, there is a problem in that it is impossible to avoid interference because a bumper flange portion is located within a driving radius due to an integrated application of a bumper skin.

SUMMARY OF THE INVENTION

The present invention is directed to providing an active air flap apparatus for a vehicle capable of effectively operating an active air flap by integrating a front surface of a flap portion and a front surface of a grill and minimizing the influence of air when the active air flap is operated.

The above and other objects, advantages, and features of the present invention, and a method for achieving them will become apparent with reference to the embodiments described below in detail in conjunction with the accompanying drawings.

According to an embodiment of the present invention, there is provided an active air flap apparatus for a vehicle, including a frame coupled to a rear surface of a grill in which an air inlet is disposed, a flap portion slidably coupled to an inside of the frame to open or close the air inlet, an actuator coupled to the outside of the frame to transmit power to the flap portion to open or close the air inlet, and a gear unit configured to transmit the power generated from the actuator to the flap portion, in which the flap portion is provided as a pair of flap portions, and the pair of flap portions are configured to close an upper region and a lower region of the air inlet to close the air inlet, while a distance between end portions of the pair of flap portions in a direction toward the air inlet increases.

The frame may include a pair of vertical frames spaced apart from each other, and a pair of horizontal frames disposed at upper end portions and lower end portions of the vertical frames to connect the pair of vertical frames.

Any one vertical frame of the pair of vertical frames may include an upper sliding groove slidably coupled to one of the pair of flap portions, a lower sliding groove disposed below the upper sliding portion and slidably coupled to the other one of the pair of flap portions, a pair of guide members disposed on inner surfaces of the pair of vertical frames to guide horizontal movement and vertical movement of the flap portions, and a support member disposed outside the vertical frame to support the gear unit.

Each of the guide members may include an upper guide portion configured to guide horizontal movement and vertical upward movement of the one of the pair of flap portions, and a lower guide portion configured to guide horizontal movement and vertical downward movement of the other one of the pair of flap portions.

The upper guide portion may include a first horizontal groove configured to guide the horizontal movement of the one of the pair of flap portions, and a first vertical groove extending upward from an end portion of the first horizontal groove in the direction toward the air inlet to guide the vertical upward movement of an end portion of the one of the pair of flap portions, and the lower guide portion may include a second horizontal groove disposed parallel with the first horizontal groove to guide the horizontal movement of the other one of the pair of flap portions, and a second vertical groove extending downward from an end portion of the second horizontal groove in the direction toward the air inlet to guide the vertical downward movement of an end portion of the other one of the pair of flap portions.

A first flap member of the pair of flap portions may be configured to move along the upper guide portion, and a second flap member of the pair of flap portions may be disposed under the first flap member in parallel and configured to move along the lower guide portion.

The first flap member may include a first guard portion slidably coupled to the pair of vertical frames to open or close the upper region of the air inlet, a first rotation protrusion disposed at one end of the first guard portion and passing through one end of each of the upper sliding groove and the upper guide portion to be rotatably coupled to the gear unit, and a first guide protrusion disposed at the other end of the first guard portion and slidably coupled to the upper guide portion.

A length of the first rotation protrusion may be greater than a length of the first guide protrusion.

The first rotation protrusion may be configured to horizontally move along the upper sliding groove and a first horizontal groove of the upper guide portion, and the first guide protrusion may be configured to vertically move upward along a first vertical groove of the upper guide portion.

The second flap member may include a second guard portion slidably coupled to the pair of vertical frames to open or close a lower region of the air inlet, a second rotation protrusion disposed at one end of the second guard portion and passing through one end of each of the lower sliding groove and the lower guide portion to be rotatably coupled to the gear unit, and a second guide protrusion disposed at the other end of the second guard portion and slidably coupled to the lower guide portion.

A length of the second rotation protrusion may be greater than a length of the second guide protrusion.

The second rotation protrusion may be configured to horizontally move along the lower sliding groove and a second horizontal groove of the upper guide portion, and the second guide protrusion may be configured to vertically move downward along a second vertical groove of the lower guide portion.

The actuator may be fixed outside a vertical frame to transmit power to the gear unit.

The gear unit may include a pinion gear connected to the actuator and rotated by receiving power from the actuator, and a rack gear engaged with the pinion gear to horizontally move the flap portion.

One end portion of each of the first flap member and the second flap member is rotatably coupled to an end portion of the rack gear in a direction in which the air inlet is disposed.

According to another embodiment of the present invention, there is provided an active air flap apparatus for a vehicle, including a frame coupled to a rear surface of a grill in which an air inlet is disposed, a flap portion slidably fixed inside the frame to open or close the air inlet, an actuator coupled to an outside of the frame to transmit power to the flap portion to open or close the air inlet, and a gear unit configured to transmit the power generated from the actuator to the flap portion, in which one vertical frame of a pair of vertical frames includes a pair of guide members disposed on inner surfaces of the pair of vertical frames to guide horizontal movement and vertical movement of the flap portion, and the guide members include an upper guide portion configured to guide horizontal movement and vertical upward movement of one of the pair of flap portions, and a lower guide portion configured to guide horizontal movement and vertical downward movement of the other one of the pair of flap portions.

The upper guide portion may include a first horizontal groove configured to guide the horizontal movement of the one of the pair of flap portions, a first connection groove disposed between the first horizontal groove and a first vertical groove to change a movement direction of the one of the pair of flap portions, and the first vertical groove extending upward from an end portion of the first horizontal groove to guide the vertical upward movement of an end portion of the one of the pair of flap portions, and the lower guide portion may include a second horizontal groove disposed parallel with the first horizontal groove to guide the horizontal movement of the other one of the pair of flap portions, a second connection groove disposed between the second horizontal groove and a second vertical groove to change a movement direction of the other one of the pair of flap portions, and the second vertical groove extending downward from an end portion of the second horizontal groove to guide the vertical downward movement of an end portion of the other one of the pair of flap portions.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
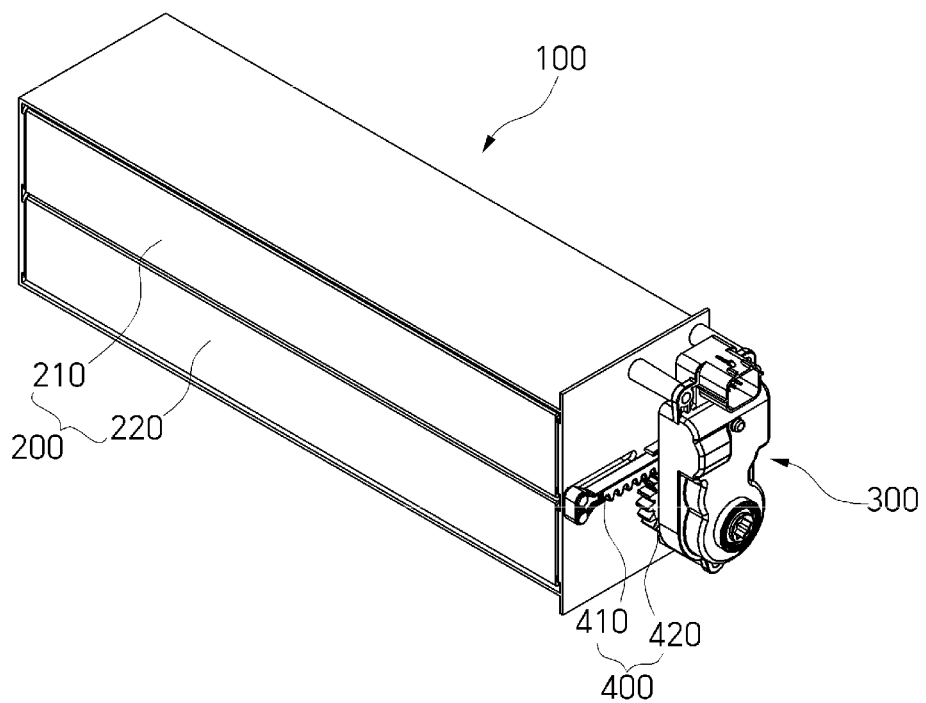
FIG. 1 is a perspective view illustrating an active air flap apparatus for a vehicle according to one embodiment of the present invention.

Embodiments of the present invention are provided to more completely explain the present invention to those of ordinary skill in the art, and the following embodiments may be modified into various other forms, and the scope of the present invention is not limited to the following embodiments. The embodiments are provided so that this disclosure will be more thorough and complete, and will fully convey the spirit of the invention to those skilled in the art. In addition, in the accompanying drawings, each component is exaggerated for convenience and clarity of description, and the same reference numerals refer to the same elements in the drawings. As used herein, the term "and/or" includes any one or all possible combinations of the listed items.

The terminology used herein is used to describe specific embodiments, not to limit the present invention.

As used herein, the singular form may include the plural form unless the context clearly dictates otherwise. Moreover, as used herein, "comprise" and/or "comprising" refers to the presence of the recited shapes, numbers, steps, operations, members, elements, and/or groups thereof, and does not exclude the presence or addition of one or more other shapes, numbers, steps, operations, members, elements and/or groups thereof.

Hereinafter, exemplary embodiments of the present invention will be described in detail with reference to the accompanying drawings.

Figure 2:
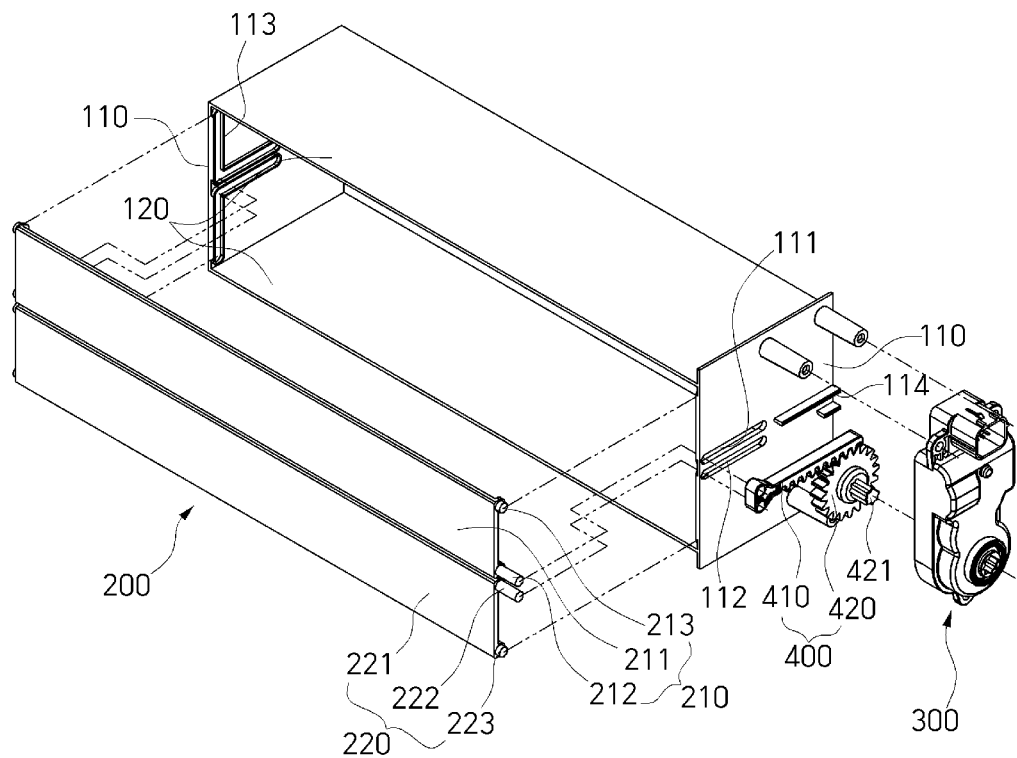
FIG. 2 is an exploded perspective view illustrating the active air flap apparatus for a vehicle according to one embodiment of the present invention.
Figure 3:
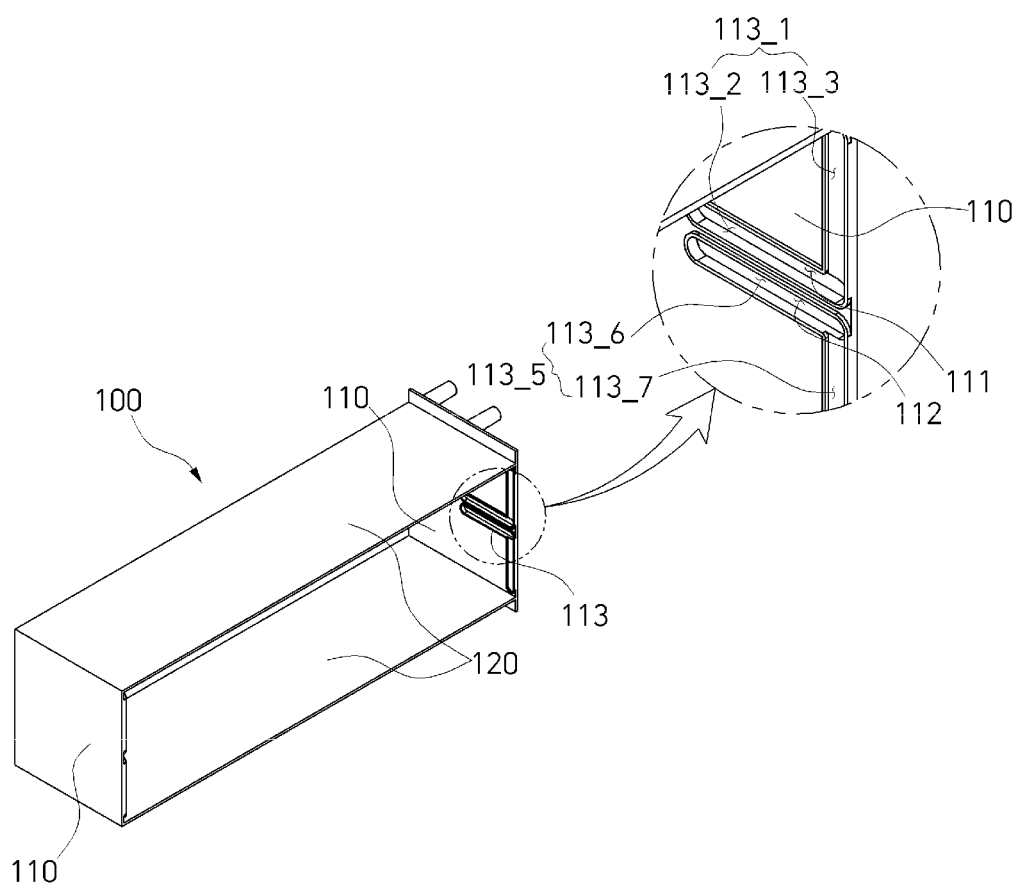
FIG. 3 is a perspective view illustrating a frame of the active air flap apparatus for a vehicle according to one embodiment of the present invention.
Figure 4:
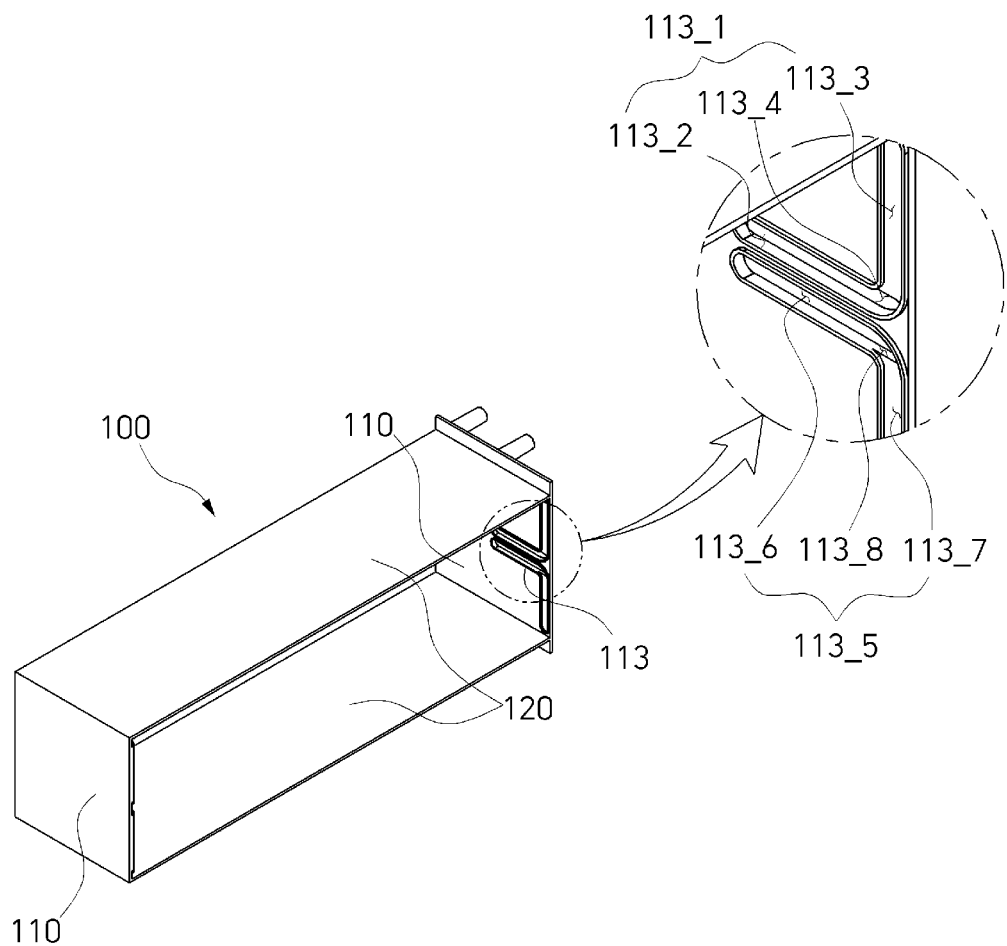
FIG. 4 is a perspective view illustrating a frame of an active air flap apparatus for a vehicle according to another embodiment of the present invention.
Figure 5:
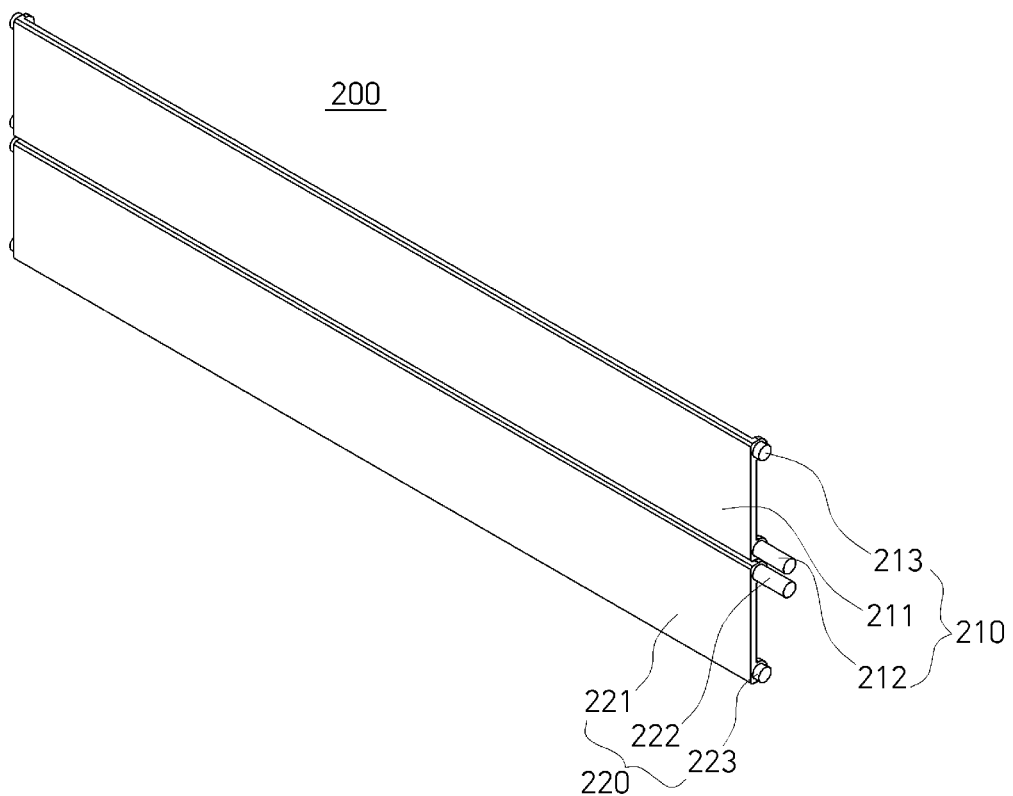
FIG. 5 is a perspective view illustrating a flap portion of the active air flap apparatus for a vehicle according to one embodiment of the present invention.
Figure 6:
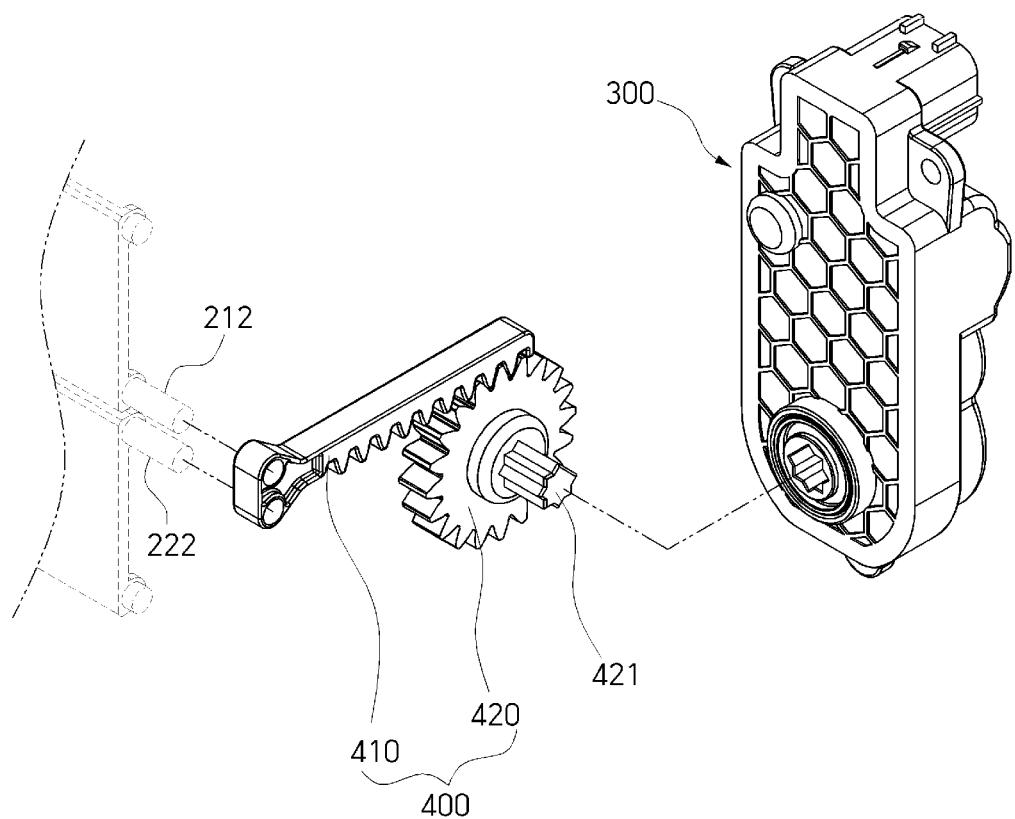
FIG. 6 is an exploded perspective view illustrating an actuator and a gear unit of the active air flap apparatus for a vehicle according to one embodiment of the present invention.

FIG. 1 is a perspective view illustrating an active air flap apparatus for a vehicle according to one embodiment of the present invention, FIG. 2 is an exploded perspective view illustrating the active air flap apparatus for a vehicle according to one embodiment of the present invention, FIG. 3 is a perspective view illustrating a frame of the active air flap apparatus for a vehicle according to one embodiment of the present invention, FIG. 4 is a perspective view illustrating a frame of an active air flap apparatus for a vehicle according to another embodiment of the present invention, FIG. 5 is a perspective view illustrating a flap portion of the active air flap apparatus for a vehicle according to one embodiment of the present invention, and FIG. 6 is an exploded perspective view illustrating an actuator and a gear unit of the active air flap apparatus for a vehicle according to one embodiment of the present invention.

Referring FIGS. 1 to 6, the active air flap apparatus for a vehicle according to one embodiment of the present invention includes a frame 100 constituting a body, a flap portion 200 including a pair of flap portions, an actuator 300 for generating driving force, and a gear unit 400 that transmits the driving force of the actuator 300 to the flap portion 200.

The frame 100 has entirely a quadrangle frame shape and is coupled to a rear surface of a grill in which an air inlet is formed.

The frame 100 is coupled to the rear surface of the grill in a screw-coupling manner.

To this end, a plurality of fixing units may be formed on a periphery of the frame 100 to be spaced apart from each other along a perimeter of the frame 100.

The frame 100 includes vertical frames 110 and horizontal frames 120.

The vertical frames 110 include a pair of panels and are horizontally spaced apart from each other in an air inlet region of the rear surface of the grill.

The vertical frames 110 are disposed on both sides of the air inlet.

The vertical frame 110 includes an upper sliding groove 111, a lower sliding groove 112, a guide member 113, and a support member.

The upper sliding groove 111 is formed in any one of the pair of vertical frames 110 and is horizontally formed in the vertical frame 110.

Moreover, the upper sliding groove 111 is slidably coupled to any one of the pair of flap portions 200.

That is, the upper sliding groove 111 is slidably coupled to the flap portion 200 disposed in an upper portion of the pair of flap portions 200.

The lower sliding groove 112 is disposed below the upper sliding groove 111 and is formed parallel to the upper sliding groove 111 on the vertical frame 110.

Moreover, the lower sliding groove 112 is slidably coupled to the other one of the pair of flap portions 200.

That is, the lower sliding groove 112 is slidably coupled to the flap portion 200 disposed in a lower portion of the pair of flap portions 200.

Meanwhile, the upper sliding groove 111 and the lower sliding groove 112 are described as being formed in only one of the pair of vertical frames 110. However, as long as the flap portion 200 can be slidably coupled to each of the upper sliding groove 111 and the lower sliding groove 112, the upper sliding groove 111 and the lower sliding groove 112 can be formed in each of the pair of vertical frames 110.

The guide member 113 is provided as a pair of guide members and formed on each of the inner surface of the pair of vertical frames 110.

Moreover, the guide member 113 guides horizontal movement and vertical movement of the flap portion 200.

The guide member 113 includes an upper guide portion 113_1 and a lower guide portion 113_5.

The upper guide portion 113_1 guides horizontal movement and vertical upward movement of any one of the pair of flap portions 200.

Specifically, the upper guide portion 113_1 is disposed above the lower guide portion 113_5 on the inner surface of the vertical frame 110, and a first flap member 210 constituting the pair of flap portions 200 is slidably coupled to the upper guide portion 113_1.

The upper guide portion 113_1 includes a first horizontal groove 113_2, a first vertical groove 113_3, and a first connection groove 113_4.

The first horizontal groove 113_2 guides the horizontal movement of any one of the pair of flap portions 200.

Preferably, one end of the first flap member 210 constituting the flap portion 200 is slidably coupled to the first horizontal groove 113_2.

In addition, the first horizontal groove 113_2 is formed at a position corresponding to the upper sliding groove 111 in the vertical frame 110.

That is, the first horizontal groove 113_2 communicates with the upper sliding groove 111.

Accordingly, the first horizontal groove 113_2 can firmly support the first flap member 210 slidably coupled to the first horizontal groove 113_2 and the upper sliding groove 111 together with the upper sliding groove 111.

The first vertical groove 113_3 extends upward from an end portion of the first horizontal groove 113_2 in the direction toward the air inlet.

Moreover, the first vertical groove 113_3 guides a vertical upward movement of an end portion of any one of the pair of flap portions 200.

Specifically, the other end of the first flap member 210 coupled to the first horizontal groove 113_2 slides along the first vertical groove 113_3.

The lower guide portion 113_5 guides horizontal and vertical downward movements of the other one of the pair of flap portions 200.

Specifically, the lower guide portion 113_5 is disposed below the upper guide portion 113_1 on the inner surface of the vertical frame 110, and a second flap member 220 constituting the pair of flap portions 200 is slidably coupled to the lower guide portion 113_5.

The lower guide portion 113_5 includes a second horizontal groove 113_6, a second vertical groove 113_7, and a second connection groove 113_8.

The second horizontal groove 113_6 guides a horizontal movement of any one of the pair of flap portions 200.

Preferably, one end of the second flap member 220 constituting the flap portion 200 is slidably coupled to the second horizontal groove 113_6.

In addition, the second horizontal groove 113_6 is formed at a position corresponding to the lower sliding groove 112 in the vertical frame 110.

That is, the second horizontal groove 113_6 communicates with the lower sliding groove 112.

Accordingly, the second horizontal groove 113_6 can firmly support the second flap member 220 slidably coupled to the second horizontal groove 113_6 and the lower sliding groove 112 together with the lower sliding groove 112.

The second vertical groove 113_7 extends downward from an end portion of the second horizontal groove 113_6 in the direction toward the air inlet.

Moreover, the second vertical groove 113_7 guides a vertical downward movement of an end portion of any one of the pair of flap portions 200.

Specifically, the other end of the second flap member 220 coupled to the second horizontal groove 113_6 slides along the second vertical groove 113_7.

Meanwhile, as illustrated in FIG. 4, a guide member 113 according to another embodiment of the present invention may include the first connection groove 113_4 in the upper guide portion 113_1 and the second connection groove 113_8 in the lower guide groove 113_5.

The first connection groove 113_4 is formed between the first horizontal groove 113_2 and the first vertical groove 113_3 to change a movement direction of any one of the pair of flap portions 200.

Moreover, the first connection groove 113_4 is preferably formed in a round shape.

Accordingly, when the other end of the first flap member 210 of the flap portion 200 moving from the first horizontal groove 113_2 to the first vertical direction 113_3 enters the first vertical groove 113_3, the first connection groove 113_4 allows the other end to smoothly change the movement direction.

The second connection groove 113_8 is formed between the second horizontal groove 113_6 and the second vertical groove 113_7 to change the movement direction of any one of the pair of flap portions 200.

Moreover, the second connection groove 113_8 is preferably made in a round shape.

Accordingly, when the other end of the second flap member 220 of the flap portion 200 moving from the second horizontal groove 113_6 to the second vertical direction 113_7 enters the second vertical groove 113_7, the second connection groove 113_8 allows the other end to smoothly change the movement direction.

The support member is formed to horizontally protrude from the outside of the vertical frame 110 and supports a rack gear 410 of the gear unit 400.

The support member protrudes from the vertical frame 110 of the pair of vertical frames 110 in which the upper sliding groove 111 and the lower sliding groove 112 are formed.

The horizontal frames 120 include a pair of panels as illustrated in FIGS. 1 and 2 and are vertically spaced apart from each other in the air inlet area of the rear surface of the grill.

In addition, the horizontal frames 120 are disposed at upper ends and lower ends of the pair of vertical frames 110 to connect the vertical frames 110 to each other.

Accordingly, the frame 100 has entirely a quadrangle frame shape due to the vertical frames 110 and the horizontal frames 120.

The flap portion 200 is slidably coupled to the inside of the vertical frame 110 constituting the frame 100 and opens or closes the air inlet formed in the grill.

When the flap portion 200 is opened while a vehicle travels, air is introduced from the outside of the grill through the air inlet.

Therefore, the flap portion 200 can effectively cool the inside of an engine room through the introduced air depending on whether the air inlet is opened or closed.

The flap portion 200 includes the first flap member 210 and the second flap member 220.

The first flap member 210 moves along the upper guide portion 113_1.

Moreover, when the air inlet is closed, the first flap member 210 closes an upper region of the air inlet.

The first flap member 210 includes a first guard portion 211, a first rotation protrusion 212, and a first guide protrusion 213.

The first guard portion 211 forms a body of the first flap member 210 and connects the pair of vertical frames 110 to each other.

Moreover, the first guard portion 211 is slidably coupled to the pair of vertical frames 110 and opens or closes the upper region of the air inlet.

Therefore, it is preferable that an area of the first guard portion 211 is the same as an area of the upper region of the air inlet.

The first rotation protrusion 212 is formed at one end of the first guard portion 211 and protrudes from an outer surface of the first guard portion 211 in the direction toward the vertical frame 110.

Moreover, the first rotation protrusion 212 rotatably couples the first guard portion 211 to the vertical frame 110.

To this end, the first rotation protrusion 212 passes through the upper sliding groove 111 and the first horizontal groove 113_2 of the upper guide portion 113_1 to be rotatably coupled to the gear unit 400.

Moreover, the first rotation protrusion 212 moves horizontally along the upper sliding groove 111 and the first horizontal groove 113_2 of the upper guide portion 113_1.

The first guide protrusion 213 is formed at the other end of the first guard portion 211 in a direction opposite to the direction, in which the first rotation protrusion 212 is formed, and protrudes in the direction toward the vertical frame 110 from the outer surface of the first guard portion 211.

Moreover, the first guide protrusion 213 is slidably coupled to the first vertical groove 113_3 of the upper guide portion 113_1.

That is, the first guide protrusion 213 vertically moves upward along the first vertical groove 113_3 of the upper guide portion 113_1.

Meanwhile, the first rotation protrusion 212 protrudes by a length that is greater than a length of the first guide protrusion 213.

Specifically, the first rotation protrusion 212 protrudes by as much as a thickness of the upper sliding groove 111 and a length of the upper guide portion 113_1 extending from the inner surface of the vertical frame 110.

Accordingly, the first rotation protrusion 212 can easily slide along the upper sliding groove 111 and the first horizontal groove 113_2 of the upper guide portion 113_1 in a sliding manner.

The first guide protrusion 213 protrudes by as much as the length of the upper guide portion 113_1 extending from the inner surface of the vertical frame 110.

Accordingly, the first guide protrusion 213 does not protrude from the inner surface of the vertical frame 110 and can easily slide along the first vertical groove 113_3 of the upper guide portion 113_1 in a sliding manner.

The second flap member 220 is disposed parallel to the lower portion of the first flap member 210 and moves along the lower guide portion 113_5.

Moreover, when the air inlet is closed, the second flap member 220 closes the lower region of the air inlet.

The second flap member 220 includes a second guard portion 221, a second rotation protrusion 222, and a second guide protrusion 223.

The second guard portion 221 forms a body of the second flap member 220 and connects the pair of vertical frames 110 to each other.

In addition, the second guard portion 221 is slidably coupled to the pair of vertical frames 110 and opens or closes the lower region of the air inlet opposite to the first guard portion 211.

Therefore, it is preferable that an area of the second guard portion 221 is the same as an area of the lower region of the air inlet.

The second rotation protrusion 222 is formed at one end of the second guard portion 221 and protrudes from the outer surface of the second guard portion 221 in the direction toward the vertical frame 110.

In addition, the second rotation protrusion 222 rotatably couples the second guard portion 221 to the vertical frame 110.

To this end, the second rotation protrusion 222 is rotatably coupled to the gear unit 400 through the lower sliding groove 112 and the second horizontal groove 113_6 of the lower guide unit 113_5.

Moreover, the second rotation protrusion 222 moves horizontally along the lower sliding groove 112 and the second horizontal groove 113_6 of the lower guide portion 113_5.

The second guide protrusion 223 is formed at the other end of the second guard portion 221 in a direction opposite to the direction, in which the second rotation protrusion 222 is formed, and protrudes in the direction toward the vertical frame 110 from the outer surface of the second guard portion 221.

Moreover, the second guide protrusion 223 is slidably coupled to the second vertical groove 113_7 of the lower guide portion 113_5.

That is, the second guide protrusion 223 vertically moves downward along the second vertical groove 113_7 of the lower guide portion 113_5.

Meanwhile, the second rotation protrusion 222 protrudes by a length that is greater than a length of the second guide protrusion 223.

Specifically, the second rotation protrusion 222 protrudes by as much as a thickness of the lower sliding groove 112 and a length of the lower guide portion 113_5 extending from the inner surface of the vertical frame 110.

Accordingly, the second rotation protrusion 222 can easily slide along the lower sliding groove 112 and the second horizontal groove 113_6 of the lower guide portion 113_5 in a sliding manner.

The second guide protrusion 223 protrudes by as much as a length of the lower guide portion 113_5 extending from the inner surface of the vertical frame 110.

Accordingly, the second guide protrusion 223 does not protrude from the inner surface of the vertical frame 110 and can easily slide along the second vertical groove 113_7 of the lower guide portion 113_5 in a sliding manner.

Therefore, when the air inlet is closed, the end portions of the first flap member 210 and the second flap member 220 constituting the flap portion 200 in the direction toward the air inlet, that is, the first guide protrusion 213 and the second guide protrusion 223, are spaced apart from each other so that the upper and lower regions of the air inlet can be effectively closed.

In particular, when the first guard portion 211 and the second guard portion 221 close the air inlet, it is possible to integrate the front surfaces of the first flap member 210 and the second flap member 220 and the front surface of the grill in the outward direction of the vehicle.

Moreover, when the first guard portion 211 and the second guard portion 221 open the air inlet, the first flap member 210 and the second flap member 220 slide in the direction toward the rear surface of the grill, and thus, it is possible to prevent the first guard portion 211 and the second guard portion 221 from protruding to the outside of the grill.

With reference to FIGS. 2 and 6, the actuator 300 is coupled to the outside of the frame 100 and generates power.

Moreover, the actuator 300 transmits power to the gear unit 400.

To this end, a rotating shaft 421 is coupled to the actuator 300 and the gear unit 400.

The rotating shaft 421 connects the actuator 300 and the gear unit 400.

The gear unit 400 transmits the power of the actuator 300 received through the rotating shaft 421 to the flap portion 200.

The gear unit 400 includes a pinion gear 420 and a rack gear 410.

The pinion gear 420 is coupled to an end portion of the rotating shaft 421 extending from the actuator 300.

Moreover, the pinion gear 420 is rotated by receiving power generated from the actuator 300.

The rack gear 410 is supported by the support member formed on the outer surface of the vertical frame 110.

The first rotation protrusion 212 of the first flap member 210 and the second rotation protrusion 222 of the second flap member 220 are rotatably coupled to an end portion of the rack gear 410 in the direction in which the air inlet is disposed.

Moreover, the rack gear 410 engages the pinion gear 420 to move the first flap member 210 and the second flap member 220 in the horizontal direction.

Accordingly, the first flap member 210 and the second flap member 220 are slid in the horizontal direction by the gear unit 400.

Hereinafter, an operating relationship of the active air flap apparatus for a vehicle according to one embodiment of the present invention will be described with reference to the accompanying drawings.

Figure 7:
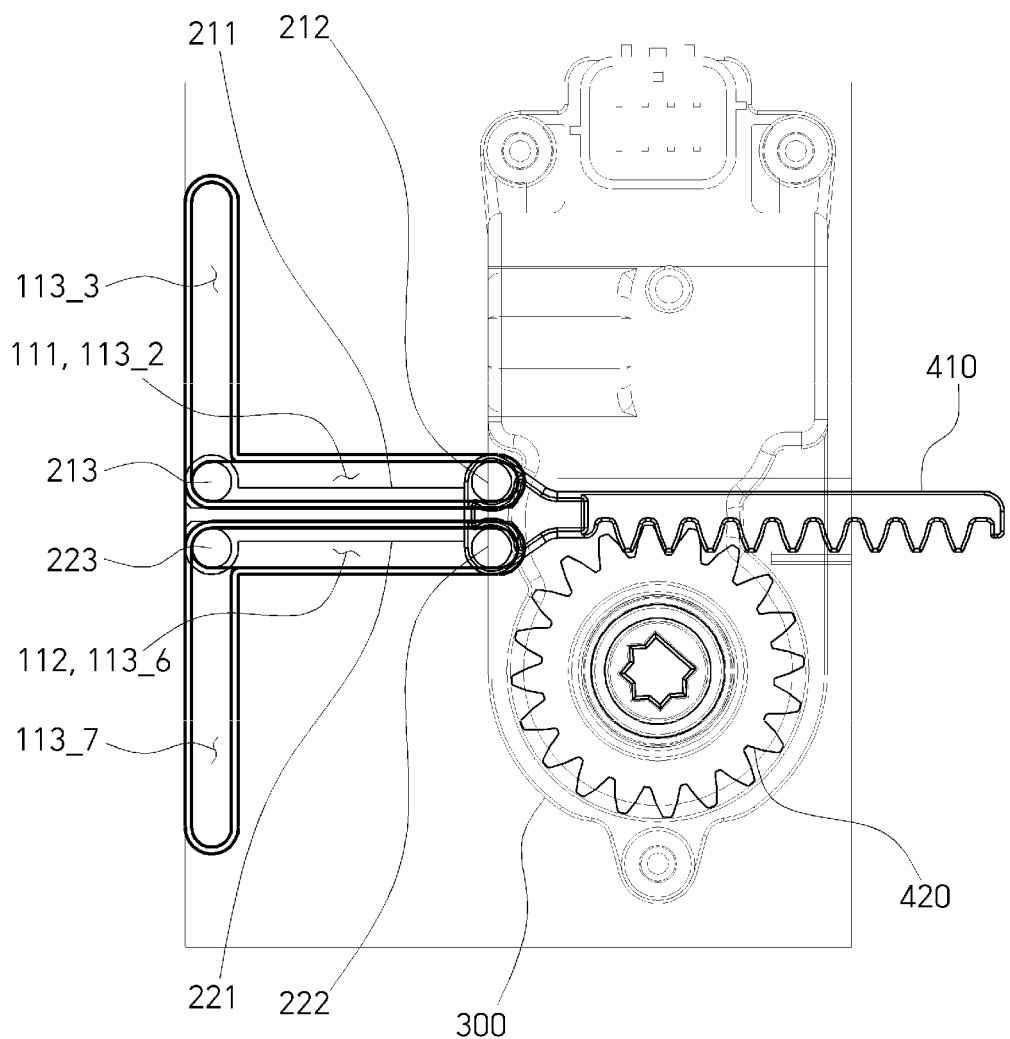
FIGS. 7 to 9 are operational views illustrating an operating state of the active air flap apparatus for a vehicle according to one embodiment of the present invention.
Figure 8:
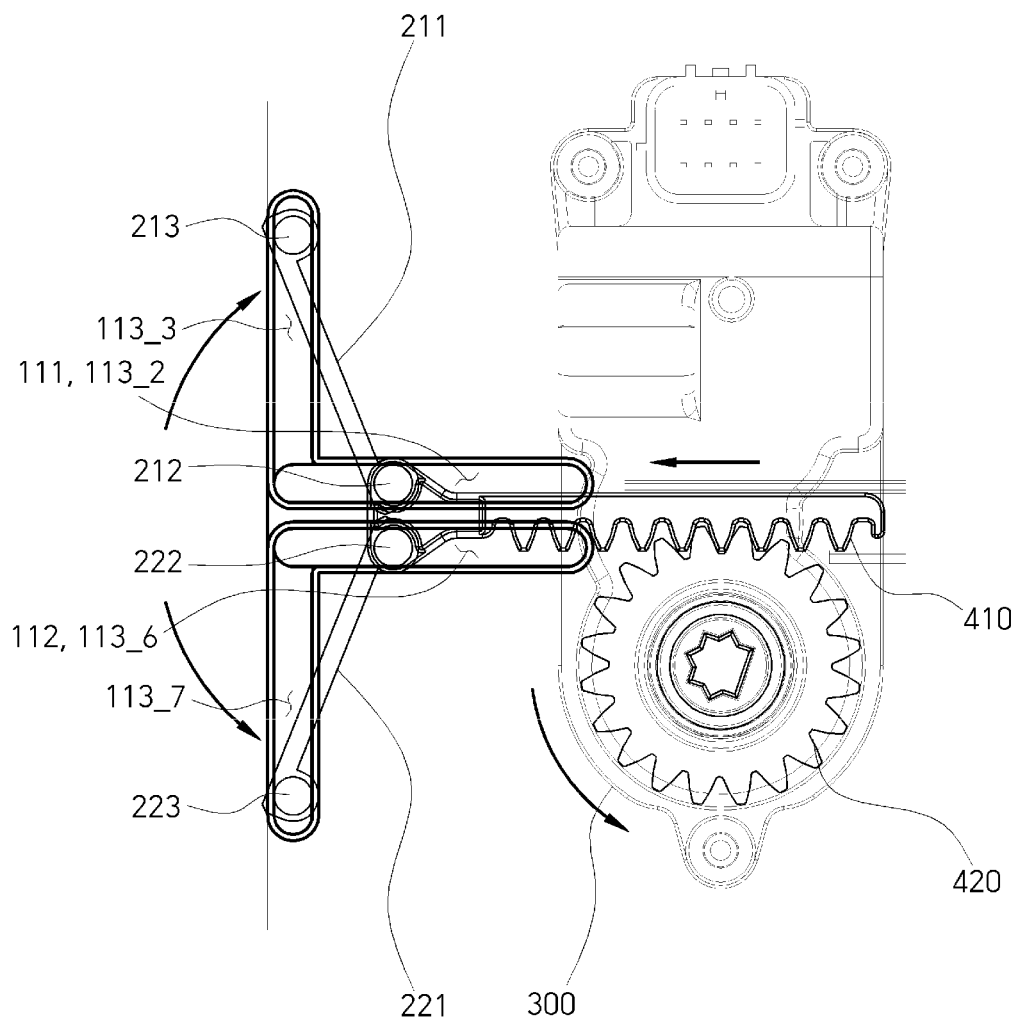
Figure 9:
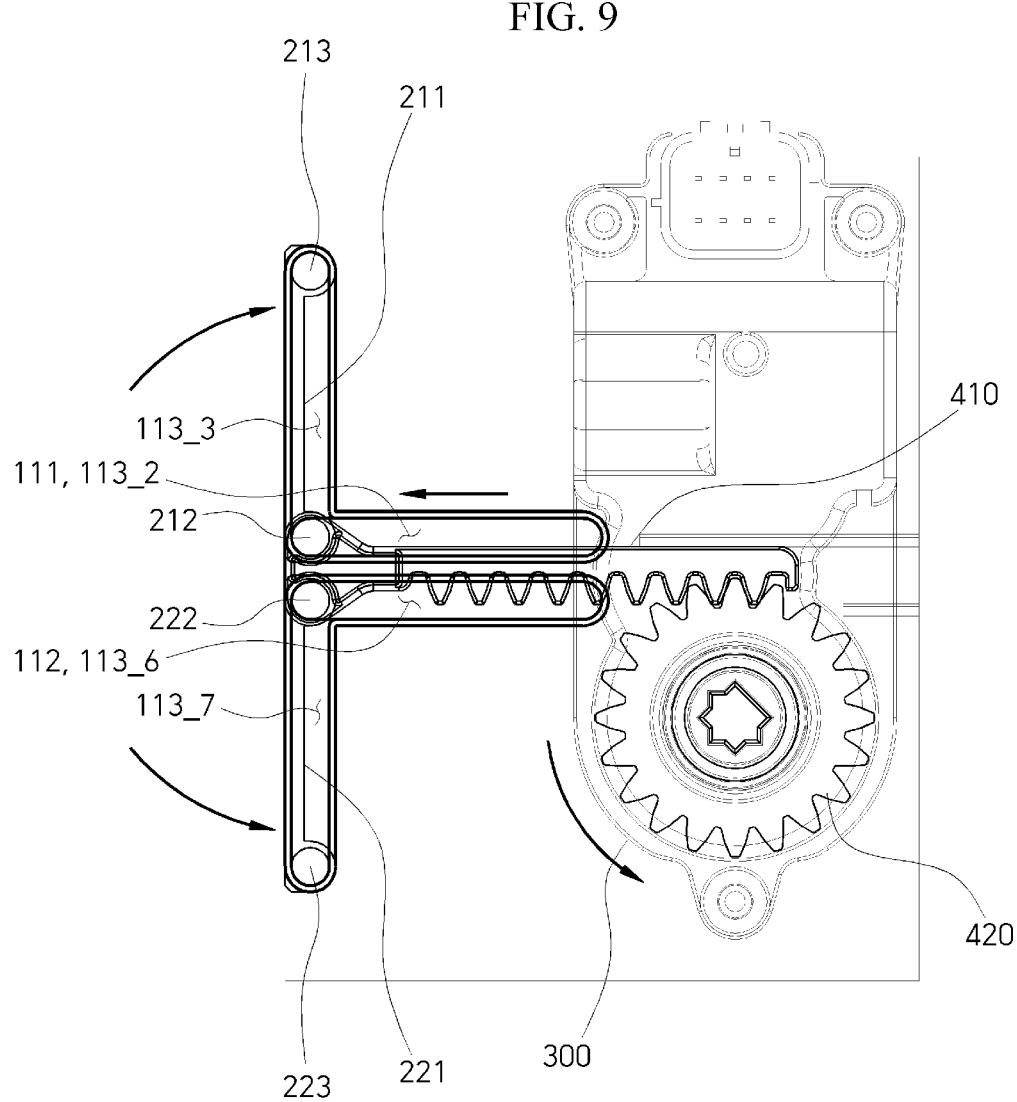

FIGS. 7 to 9 are operational views illustrating an operating state of the active air flap apparatus for a vehicle according to one embodiment of the present invention.

First, referring to FIG. 7, in a case where the air inlet formed in the grill is closed, when power is generated from the actuator 300, the rotating shaft 421 connected to the actuator 300 rotates and the pinion gear 420 of the gear unit 400 rotates.

Then, the rack gear 410 engaged with the rotating pinion gear 420 moves forward in the horizontal direction.

In this case, as illustrated in FIG. 8, the first rotation protrusion 212 of the first flap member 210 rotatably coupled to the end portion of the rack gear 410 in the direction toward the air inlet horizontally moves forward along the first horizontal groove 113_2, and the second rotation protrusion 222 of the second flap member 220 rotatably coupled thereto horizontally moves forward along the second horizontal groove 113_6.

Then, the first guide protrusion 213 of the first flap member 210 coupled to the first vertical groove 113_3 vertically moves upward along the first vertical groove 113_3, and the second guide protrusion 223 of the second flap member 220 coupled to the second vertical groove 113_7 vertically moves downward along the second vertical groove 113_7.

Accordingly, as illustrated in FIG. 9, the first flap member 210 closes the upper region of the air inlet, and the second flap member 220 closes the lower region of the air inlet.

Conversely, when the air inlet is opened, the reverse order of FIGS. 7 to 9 is performed.

Specifically, when power is generated from the actuator 300, the rotating shaft 421 is rotated and the pinion gear is rotated.

Then, the rack gear engaged with the rotating pinion gear 420 moves rearward in the horizontal direction.

In this case, the first rotation protrusion 212 of the first flap member 210 rotatably coupled to the end portion of the rack gear 410 horizontally moves rearward along the first horizontal groove 113_2, and the second rotation protrusion 222 of the second flap member 220 rotatably coupled thereto horizontally moves rearward along the second horizontal groove 113_6.

Then, the first guide protrusion 213 of the first flap member 210 vertically moves downward along the first vertical groove 113_3, and the second guide protrusion 223 of the second flap member 220 vertically moves upward along the second vertical groove 113_7.

For this reason, the first guide protrusion 213 and the second guide protrusion 223 are close to each other along the first vertical groove 113_3 and the second vertical groove 113_7.

Therefore, in the active air flap apparatus for a vehicle according to one embodiment of the present invention, as illustrated in FIG. 8, when the first guard portion 211 and the second guard portion 221 open the air inlet, the first flap member 210 and second flap members 220 slide in the direction toward the rear surface of the grill, and thus, it is possible to prevent the first guard portion 211 and the second guard portion 221 from protruding to the outside of the grill.

According to the present invention, when the air inlet is closed, the first guide protrusion and the second guide protrusion are spaced apart from each other, and thus, the first flap member and the second flap member can effectively close the upper and lower regions of the air inlet.

Moreover, when the air inlet is closed, the first guard portion and the second guard portion can integrate the front surfaces of the first flap member and the second flap member and the front surface of the grill in the outward direction of the vehicle.

In addition, when the air inlet is opened, the first flap member and the second flap member slide in the direction toward the rear surface of the grill, and thus, it possible to prevent the first guard portion and the second guard portion from protruding to the outside of the grill.

As such, the embodiments disclosed in this specification should be considered from an exemplary point of view for description rather than a limiting point of view. The scope of the present invention is indicated in claims rather than the foregoing description, and all differences within an equivalent scope should be construed as being included in the present invention.

What is claimed is:

1. An active air flap apparatus for a vehicle, comprising:
   a frame coupled to a rear surface of a grill in which an air inlet is disposed;
   a flap portion slidably coupled to an inside of the frame to open or close the air inlet;
   an actuator coupled to an outside of the frame to transmit power to the flap portion to open or close the air inlet; and
   a gear unit configured to transmit the power generated from the actuator to the flap portion,
   wherein the flap portion is provided as a pair of flap portions, and
   the actuator is configured to move first end portions of the pair of flap portions in a direction away from the actuator so as to slidably move second end portions of the pair of flap portions away from each other, such that an upper region and a lower region of the air inlet are respectively closed by the pair of flap portions.

2. The active air flap apparatus for a vehicle of claim 1, wherein the frame includes:
   a pair of vertical frames spaced apart from each other; and
   a pair of horizontal frames disposed at upper end portions and lower end portions of the vertical frames to connect the pair of vertical frames.

3. The active air flap apparatus for a vehicle of claim 2, wherein any one vertical frame of the pair of vertical frames includes:
   an upper sliding groove slidably coupled to one of the pair of flap portions;
   a lower sliding groove disposed below the upper sliding portion and slidably coupled to the other one of the pair of flap portions;
   a pair of guide members disposed on inner surfaces of the pair of vertical frames to guide horizontal movement and vertical movement of the flap portions; and
   a support member disposed outside the vertical frame to support the gear unit.

4. The active air flap apparatus for a vehicle of claim 3, wherein each of the guide members includes:
   an upper guide portion configured to guide horizontal movement and vertical upward movement of the one of the pair of flap portions; and
   a lower guide portion configured to guide horizontal movement and vertical downward movement of the other one of the pair of flap portions.

5. The active air flap apparatus for a vehicle of claim 4, wherein the upper guide portion includes:
   a first horizontal groove configured to guide the horizontal movement of the one of the pair of flap portions; and
   a first vertical groove extending upward from an end portion of the first horizontal groove in the direction toward the air inlet to guide the vertical upward movement of an end the second end portion of the one of the pair of flap portions, and
   the lower guide portion includes:
   a second horizontal groove disposed parallel with the first horizontal groove to guide the horizontal movement of the other one of the pair of flap portions; and
   a second vertical groove extending downward from an end portion of the second horizontal groove in the direction toward the air inlet to guide the vertical downward movement of the second end portion of the other one of the pair of flap portions.

6. The active air flap apparatus for a vehicle of claim 4, wherein
a first flap member of the pair of flap portions is configured to move along the upper guide portion; and
a second flap member of the pair of flap portions is disposed under the first flap member in parallel and configured to move along the lower guide portion.

7. The active air flap apparatus for a vehicle of claim 6, wherein the first flap member includes:
a first guard portion slidably coupled to the pair of vertical frames to open or close the upper region of the air inlet;
a first rotation protrusion disposed at one end of the first guard portion and passing through one end of each of the upper sliding groove and the upper guide portion to be rotatably coupled to the gear unit; and
a first guide protrusion disposed at the other end of the first guard portion and slidably coupled to the upper guide portion.

8. The active air flap apparatus for a vehicle of claim 7, wherein a length of the first rotation protrusion is greater than a length of the first guide protrusion.

9. The active air flap apparatus for a vehicle of claim 7, wherein the first rotation protrusion is configured to horizontally move along the upper sliding groove and a first horizontal groove of the upper guide portion, and
the first guide protrusion is configured to vertically move upward along a first vertical groove of the upper guide portion.

10. The active air flap apparatus for a vehicle of claim 6, wherein the second flap member includes:
a second guard portion slidably coupled to the pair of vertical frames to open or close the lower region of the air inlet;
a second rotation protrusion disposed at one end of the second guard portion and passing through one end of each of the lower sliding groove and the lower guide portion to be rotatably coupled to the gear unit; and
a second guide protrusion disposed at the other end of the second guard portion and slidably coupled to the lower guide portion.

11. The active air flap apparatus for a vehicle of claim 10, wherein a length of the second rotation protrusion is greater than a length of the second guide protrusion.

12. The active air flap apparatus for a vehicle of claim 10, wherein the second rotation protrusion is configured to horizontally move along the lower sliding groove and a second horizontal groove of the upper guide portion, and
the second guide protrusion is configured to vertically move downward along a second vertical groove of the lower guide portion.

13. The active air flap apparatus for a vehicle of claim 1, wherein the actuator is fixed outside a vertical frame to transmit power to the gear unit.

14. The active air flap apparatus for a vehicle of claim 6, wherein the gear unit includes:
a pinion gear connected to the actuator and rotated by receiving power from the actuator; and
a rack gear engaged with the pinion gear to horizontally move the flap portion.

15. The active air flap apparatus for a vehicle of claim 14, wherein the first end portion of each of the first flap member and the second flap member is rotatably coupled to an end portion of the rack gear in a direction in which the air inlet is disposed.

16. An active air flap apparatus for a vehicle, comprising:
a frame coupled to a rear surface of a grill in which an air inlet is disposed;
a flap portion slidably fixed inside the frame to open or close the air inlet;
an actuator coupled to an outside of the frame to transmit power to the flap portion to open or close the air inlet; and
a gear unit configured to transmit the power generated from the actuator to the flap portion,
wherein one vertical frame of a pair of vertical frames includes a pair of guide members disposed on inner surfaces of the pair of vertical frames to guide horizontal movement and vertical movement of the flap portion,
the flap portion is provided as a pair of flap portions,
the guide members include:
an upper guide portion configured to guide horizontal movement and vertical upward movement of one of the pair of flap portions; and
a lower guide portion configured to guide horizontal movement and vertical downward movement of the other one of the pair of flap portions, and
the actuator is configured to:
horizontally move a first end portion of the one of the pair of flap portions along a portion of the upper guide portion in a direction away from the actuator, so as to vertically move a second end portion of the one of the pair of flap portions along another portion of the upper guide portion in a direction away from the other one of the pair of flap portions, and
horizontally move a first end portion of the other one of the pair of flap portions along a portion of the lower guide portion in the direction away from the actuator, so as to vertically move a second end portion of the other one of the pair of flap portions along another portion of the lower guide portion in a direction away from the one of the pair of flap portions.

17. The active air flap apparatus for a vehicle of claim 16, wherein the upper guide portion includes:
a first horizontal groove configured to guide the horizontal movement of the one of the pair of flap portions;
a first connection groove disposed between the first horizontal groove and a first vertical groove to change a movement direction of the one of the pair of flap portions; and
the first vertical groove extending upward from an end portion of the first horizontal groove to guide the vertical upward movement of an end portion of the one of the pair of flap portions, and
the lower guide portion includes:
a second horizontal groove disposed parallel with the first horizontal groove to guide the horizontal movement of the other one of the pair of flap portions;
a second connection groove disposed between the second horizontal groove and a second vertical groove to change a movement direction of the other one of the pair of flap portions; and
the second vertical groove extending downward from an end portion of the second horizontal groove to guide the vertical downward movement of an end portion of the other one of the pair of flap portions.

* * * * *